United States Patent Office 2,876,208
Patented Mar. 3, 1959

2,876,208

PHENOLIC RESIN COMPOSITIONS CONTAINING A METAL CHELATE AND GLASS FIBER IMPREGNATED THEREWITH

Marguerite Naps, Oakland, Calif., assignor to Shell Development Company, New York, N. Y., a corporation of Delaware No Drawing. Application March 18, 1954
Serial No. 417,213

13 Claims. (Cl. 260—43)

This invention relates to new and very useful compositions of matter. More particularly, the invention pertains to compositions comprising a phenolic resin having a stabilizer admixed therewith so that after curing, the product has marked retardation of deterioration and degradation caused by severe heating of the cured product.

Phenol-aldehyde condensates or phenolic resins as well as mixtures thereof with other resins have found wide and varied use in many applications. However, when the cured resins are subjected to elevated temperatures of about 400 to 600° F. for prolonged periods of time, the resins undergo deterioration and degradation so as to lose the high physical strength that is characteristic of them. Thus, for example, phenolic resins and formulations containing the same have been used as adhesives for metal-to-metal bonding. While the joinder strength of metals united with bonds of such cured resins is usefully high, the action of prolonged thermal conditions causes joinder strength to decrease greatly or become nil.

It is therefore a principal object of the present invention to provide means for effectively retarding thermal degradation of cured phenolic resins. Another object is to provide compositions of matter containing phenolic resins that will yield cured products having high thermal stability. A further object is to provide manufactured products of improved quality. Other objects will appear hereinafter.

I have now discovered that cured products from phenolic resin compositions containing metal chelates have excellent heat resistance. By incorporating a minor amount of metal chelate with a potentially reactive condensate of a phenol and an aldehyde, and then subjecting the composition to curing conditions by any of the well-known procedures for converting phenolic resins to insoluble and infusible cured products, a material is obtained which has much improved qualities with respect to degradation and deterioration under the influence of elevated temperatures.

The phenolic resins suitable for use in the compositions are of the most varied type and character. They are broadly condensates of one or more phenols with one or more aldehydes. Although it is convenient to incorporate the metal chelates with the phenol-aldehyde condensates while they are still in the initial or A-stage of resinification, the invention includes compositions where resinification has advanced to the B-stage or C-stage. Also included are compositions containing so-called novolac resins which require addition of a converting agent such as paraformaldehyde or hexamethylene tetramine in order to enable cure to an insoluble and infusible state.

Very suitable phenol-aldehyde condensates are products formed by the reaction of phenols with aldehydes, particularly formaldehyde, to form condensation products containing reactive hydroxyl groups. Phenol and formaldehyde, for example, react to form somewhat different reaction products depending upon the proportion of reactants and conditions of reaction, which products may contain only phenolic hydroxyl groups or contain both phenolic and alcoholic hydroxyl groups. The phenol may be reacted with an excess, equivalent, or insufficient molecular amount of aldehyde, and use may be of acidic or basic catalysts as well as both of the same in several stages as is well-known in the art.

Preferred phenolic resins are A-stage products obtained by condensation of phenol with a molecular excess of formaldehyde in the presence of a small amount of base, such as sodium or barium hydroxide, under mild temperature conditions so that methylolphenol predominates in the product. If desired, nevertheless, the phenolic resin may be derived from one or more other mononuclear phenols, polynuclear phenols, monohydric phenols or polyhydric phenols such as cresol, xylenol, cardanol, naphthol, diphenol, diphenylolmethane, diphenylolpropane, resorcinol, and the like. Furthermore, while it is preferred that the phenolic resin be derived from formaldehyde, the resin may have resulted from condensation of the phenol with other aldehydes such as, for example, acetaldehyde, isobutylraldehyde, 2-ethylhexaldehyde, acrolein, crotonaldehyde, furfural, benzaldehyde, and the like.

The metal chelates used as stabilizer in the composition are of most varied type and character. They may be of non-ionic or ionic character. Hosts of suitable metal chelates are described and listed in the book by Martell and Calvin, "Chemistry of the Metal Chelate Compounds" (1952). It is desirable that the metal in the chelate be one possessing an ionic valence of 2 to 6 and a coordination number of 4 to 6, most of such metals being classified in the first, second, and third transition series of the Periodic Table. The chelates of metals in the first transition series constitutes a preferred group, particular reference being made to chelates of copper, chromium, ferric iron, cobaltous cobalt, nickelous nickel, and manganous manganese. Especially good stabilizing results have been realized with copper chelates.

An important structural characteristic of the metal chelates is the presence therein of ring structures wherein the metal atom is a ring member. The chelates usually contain two or more rings and the non-metallic portion of the rings is normally of organic character. The chelating agents (ligands) or compounds which make possible the formation of metal chelates from metal ions contain two or more functional groups (which may be the same or different) usually having nitrogen, oxygen and/or sulfur as electron-donating atoms.

Metal chelates used in the compositions of the invention include such representative, but non-limiting, chelates as copper 8-hydroxyquinoline, copper acetylacetone, copper benzoylacetone, dichloro bis-ethylenediamine copper, dichloro bis-diethylenetriamine copper monohydrate, copper salicylaldoxime, copper salicylate, dicyano bis-propylenediamine copper, copper glycinate, copper sulfanilate, cupric ethylacetoacetate, cupric bis-salicylaldehyde-ethylenediimine, sulfato dihydrazine copper, cobaltous ethylenediaminetetraacetate, cobaltic diaminocyclopentane, ferric bipyridyl, ferric o-phenylenebis-dimethylarsine, ferric thioglycolate, chromic 8-hydroxyquinoline, magnesium malonate, manganous bis-ethylenediamine, manganic acetylacetone, dinitrato bis-ethylenediamine nickel, palladium glycinate, palladous glycine, platinous salicylaldoxime, radium citrate, tin bis-phthalocyanine, zinc acetylacetone and the like.

As is well known, the metal chelates are usually prepared by adding the organic chelating agent to an aqueous solution of a metal salt such as a metal chloride, nitrate or sulfate. In the usual case, the formed metal chelate is obtained as a precipitate which is separated by filtration. In those cases where a water-soluble chelate is formed, a non-aqueous medium such as an alcohol is used in which the chelate is substantially insoluble.

The compositions of the invention are prepared by intimately and homogeneously mixing the metal chelate with the phenolic resin. In those cases where the phenolic resin is a liquid or syrupy fluid, the metal chelate can be merely stirred into the fluid. When the phenolic resin is a fusible solid, the resin is heated until molten or fluid and then the metal chelate is mixed in with stirring. It is desirable that the state of cure of the phenolic resin not be materially advanced during incorporation of the chelate. This is accomplished by keeping the heating needed for incorporation of the chelate to a minimum when a heat-reactive resin is used. With novolac resins which do not cure alone by heating, such precautions are not necessary since the curing agent can be added after the metal chelate has been incorporated with the resin. In general, the metal chelate constitutes a minor proportion of the compositions, and quite small amounts such as about an added 0.05 to 10% by weight are well suited for many purposes.

Various other ingredients may be present in the composition of the invention such as pigments, fillers, plasticizers, hardening or curing agents, and other resins including urea-formaldehyde condensates, melamine-formaldehyde condensates, furfural resins, cumarone-indene resins, polyvinyl resins, and the like. Particularly useful compositions comprise a phenol-aldehyde condensate containing reactive hydroxyl groups, a glycidyl polyether of a polyhydric phenol, and a metal chelate.

The glycidyl polyethers of polyhydric phenols which are used in the compositions are now well-known substances, suitable examples of which are described in various patents and publications such as, for instance, the Newey and Shokal patent, U. S. 2,642,412. As explained therein, the glycidyl polyethers of polyhydric phenols are obtained by condensing epichlorhydrin with a polyhydric phenol while using a base such as sodium hydroxide to neutralize and combine with the liberated hydrochloric acid. The glycidyl polyethers are derived from various polyhydric phenols such as resorcinol, hydroquinone, phloroglucinol, 1,1-bis(4-hydroxy-phenyl)ethane, 2,2-bis-(4-hydroxyphenyl)propane, 2,2-bis(2-hydroxynaphthyl)-butane, 1,5-dihydroxy-naphthalene, novolac resins and the like.

Compositions giving excellent performance at high temperatures in cured condition as metal-to-metal adhesives contain the metal chelate stabilizer incorporated with a mixture of a phenol-aldehyde condensate having reactive hydroxyl groups and a glycidyl polyether of a polyhydric phenol having an epoxy equivalency greater than 1.0. Such compositions have markedly superior performances as compared to compositions containing only the metal chelate and the phenol-aldehyde condensate. Best results are obtained when the phenolic resin constitutes the major proportion and the glycidyl polyether the minor proportion of the mixture. The metal chelate is present in the composition as about an added 0.1 to 10 or 20%, preferably about 0.1 to 5% by weight of the mixture.

In compositions intended for adhesive purposes, it is preferred to use an A-stage condensate of a phenol with formaldehyde, particularly of phenol with a molecular excess of formaldehyde. These well-known condensates largely predominate in mono- and dimethylol phenols and often have some water associated therewith so that they are of syrupy character. It is also preferred to use glycidyl polyethers of 2,2-bis(4-hydroxyphenyl)-propane, with such A-stage condensates. These glycidyl polyethers usually have an epoxy equivalency between about 1.4 and 2.0, the epoxy equivalency being the number of epoxy groups contained in an average molecule of the polyether. Very useful compositions are obtained by employing glycidyl polyethers of 2,2-bis(4-hydroxyphenyl)-propane having an epoxide equivalent weight of about 250 to 1000, and preferably of about 300 to 700. The metal chelate included in the composition is very effective in preventing degradation and retarding loss of strength by action of elevated temperature upon the cured composition.

In using the compositions of the invention, the composition is heated at about 50° C. to 200° C. so as to thermoset and harden the resin component thereof, and this hardening action may be assisted by any suitable hardening or curing agent for the phenolic resin such as alkalies and other basic-acting substances. Furthermore, when the composition also contains a glycidyl polyether of a polyhydric phenol, a curing agent for the glycidyl polyether may also be employed including mono-amines, polyamines, and like materials. Dicyandiamide is a preferred curing agent for use in such mixed compositions. Use of a glycidyl polyether curing agent is not essential for resinifying the mixed compositions.

The compositions of the invention are very useful and may be employed for various purposes such as for adhesives, protective coating, fabrication of articles of manufacture, and the like. The cured compositions have the valuable property of resisting degradation at elevated temperatures.

When the compositions are used as adhesives for metal-to-metal bonding, it has been found advantageous to impregnate cotton, wool, synthetic fiber or glass cloth textiles with the compositions, and then use the impregnated textile as a bonding tape for joining the metals. Such tapes provide convenient means for handling and using the compositions in adhesive applications. The tape is inserted between two metals desired to be joined, and the assembly is heated and baked to cure the resin, whereby articles are obtained wherein the joined surfaces have not only excellent strength at ordinary temperature, but also retain good strength even though heated at quite elevated temperatures for long periods of time. A preferred tape for such use has a glass fiber textile impregnated with a solid mixed composition containing in parts by weight: about 50 to 75 parts of an A-stage condensate of phenol with formaldehyde, about 25 to 50 parts of a glycidyl polyether of 2,2-bis(4-hydroxyphenyl)propane having an epoxide equivalent weight of about 300 to 700, about 50 to 150 parts of aluminum powder or dust, about 2 to 10 parts of dicyandiamide, and about 0.1 to 5 parts of a copper chelate.

The invention is illustrated in the following examples, but is not to be construed as limited to details described therein. The parts and percentages are by weight.

*Example I*

An adhesive composition was prepared and tested with several copper chelates. The resin-forming constituents comprised a phenolic resin and a glycidyl polyether of a polyhydric phenol. The phenolic resin was an A-stage product obtained by conventional condensation of a molar excess of formalin with phenol using sodium hydroxide as catalyst. Analysis of the phenolic resin gave the following values:

| | |
|---|---|
| Water, percent | 16.5 |
| Free phenol | 2.5 |
| pH | 8.5 |
| Viscosity in centipoises at 77° F. | 8,700 |
| Methylol value, equivalents/100 g. | 0.68 |
| Carbonyl value, equivalents/100 g. | 0.133 |

The glycidyl polyether had been prepared by reacting a mole of bis-phenol A (2,2-bis(4-hydroxyphenyl)propane) in customary fashion with 1.57 moles of epichlorhydrin and 1.88 moles of sodium hydroxide. The glycidyl polyether had a Durrans' mercury method softening point of 70° C., a molecular weight of 900 as measured ebullioscopically in ethylene dichloride, and an epoxy value of 0.2 epoxy equivalent per 100 grams.

About 33 parts of the glycidyl polyether was melted and heated to about 175° F. to 190° F., and about 67 parts of the phenolic resin was added with stirring while gradually increasing the temperature to about 210° F. There were then added with stirring about 100 parts of aluminum dust as filler, 6 parts of powdered dicyandiamide as curing agent, and the number of parts of copper chelate indicated in the table below. The mixture was heated for about 10 to 12 minutes and spread with a 5 mil doctor blade while fluid at about 190° F. on two clean aluminum sheets heated to about 250° F. Two coated sheets were joined and baked for 30 minutes in an oven set at 330° F. in order to cure the adhesive. The tensile shear strength in pounds per square inch (p. s. i.) at 500° F. was then determined as described in U. S. A. F. Specification MIL-8331. An initial measurement was made, and also a measurement after subjecting joined sheets to heating for 200 hours at 500° F.

| Parts of Copper Chelate | Shear Strength at 500° F., p. s. i. | |
| --- | --- | --- |
| | Initial | After Heating at 500° F. for 200 Hours |
| None | 1,155 | 0 |
| 0.25 Cu acetylacetone | 1,380 | 670 |
| 0.5 Cu acetylacetone | 1,220 | 615 |
| 1.0 Cu acetylacetone | 1,090 | 505 |
| 2.0 Cu acetylacetone | 1,220 | 400 |
| 0.25 Cu 8-hydroxyquinoline | 1,305 | 795 |
| 0.5 Cu 8-hydroxyquinoline | 1,260 | 745 |
| 1.0 Cu 8-hydroxyquinoline | 1,460 | 780 |
| 2.0 Cu 8-hydroxyquinoline | 1,345 | 690 |
| 0.25 Cu salicylaldoxime | 1,280 | 375 |
| 0.5 Cu salicylaldoxime | 1,270 | 640 |
| 1.0 Cu salicylaldoxime | 1,265 | 490 |
| 2.0 Cu salicylaldoxime | 1,195 | 405 |
| 0.25 Cu dihydrazine sulfate | 1,145 | 665 |
| 0.5 Cu dihydrazine sulfate | 1,160 | 725 |
| 1.0 Cu dihydrazine sulfate | 945 | 695 |
| 2.0 Cu dihydrazine sulfate | 975 | 410 |

The foregoing data demonstrates the excellent inhibition of the phenolic resin against degradation at the elevated temperature obtained with the copper chelates.

Example II

In order to test the stabilizing effect of metal chelates on an adhesive composition containing a phenolic resin as the only resin-forming constituent, a composition was prepared in similar manner to the description given in Example I. The composition contained 100 parts of the phenolic resin described in Example I, 100 parts of aluminum dust, 6 parts of dicyandiamide, and the parts of metal chelate listed in the table below. The shear strengths at 500° F. of aluminum sheets joined with the adhesive were again determined initially and after heating for 200 hours at 500° F.

| Parts of Copper Chelate | Shear Strength at 500° F., p. s. i. | |
| --- | --- | --- |
| | Initial | After Heating at 500° F. for 200 Hours |
| None | 885 | 0 |
| 0.5 Cu acetylacetone | 940 | 185 |
| 0.5 Cu 8-hydroxyquinoline | 1,295 | 205 |
| 0.5 Cu salicylaldoxime | 1,200 | 120 |

Example III

An adhesive composition like that described in Example I was prepared which contained 1.0 part of an 8-hydroxyquinoline chelate of the several metal ions listed below. Again the mixtures were used to join aluminum sheets and the shear strengths at 500° F. were measured both before and after heating for 200 hours at 500° F.

| Metal Ion in 8-Hydroxy-quinoline Chelate | Shear Strength at 500° F., p. s. i. | |
| --- | --- | --- |
| | Initial | After Heating at 500° F. for 200 Hours |
| Cobaltous | 1,480 | 455 |
| Chromic | 1,765 | 625 |
| Ferric | 1,480 | 625 |
| Manganous | 1,355 | 580 |

Example IV

This example will illustrate the function of time of aging at 500° F. upon the strength retention of cured bonds of a composition of the invention. The composition used was as described in Example I and contained one part of cupric bis-diethylenetriamine dibromide monohydrate as the metal chelate. Immediately after preparation of the composition, a film of the mixture was cast on a cellophane barrier film using a heated coater and a doctor blade. The mixture was kept spreadably fluid during application to the barrier film by warming within the range of about 170 to 190° F. The adhesive solidified rapidly upon cooling and was wound as a roll. The tape was used by removing the barrier film and placing the tape between two sheets of clean aluminum. The assembly was lightly clamped together, and cured by heating for one-half hour in an oven set at about 330° F. Sufficient bonded sheets were prepared to permit shear strength measurements at 500° F. to be made initially and after heating at 500° F. for the time intervals listed in the table below. It is seen from the data in the table that the shear strength values level off to a substantially constant value in about 200 hours heating at 500° F.

| Hours of exposure at 500° F.: | Shear strength at 500° F., p. s. i. |
| --- | --- |
| 0 | 1410 |
| 8 | 1345 |
| 24 | 1300 |
| 48 | 1105 |
| 96 | 1025 |
| 168 | 845 |
| 200 | 810 |

Example V

This example will illustrate an important variation of the invention, namely, a glass cloth fabric impregnated with the composition containing a metal chelate stabilizer, which impregnated fabric is useful and convenient for adhesively joining metal.

Four batches of a composition were prepared as described in Example I from 33 parts of the glycidyl polyether, 67 parts of the phenolic resin, 100 parts of aluminum dust, 6 parts of dicyandiamide, and 1 part of copper 8-hydroxyquinoline. While the mixture was at about 200° F. so as to be fluid and homogeneous, glass cloth known as Fiberglas 106–Volan A was passed through the hot composition and scraped with blades. Upon cooling with solidification of the adhesive composition, the resulting tape was wound with use of a cellophane barrier film. The adhesive tape was stored about 2.5 weeks at about 30° F. and then used to bond clean aluminum sheets. The adhesive tape (without the barrier film) was placed between two aluminum sheets. The assembly was clamped lightly together, and cured by heating for one-half hour in an oven set at about 330° F. Shear strength values of joined sheets prepared using tapes from each of the batches were determined. It was found that the initial shear strength at 500° F. averaged 1545 p. s. i. and was 500 p. s. i. after heating at 500° F. for 200 hours.

*Example VI*

Another glass cloth tape as described in Example V was prepared using the same composition except that cupric bis-diethylenetriamine dichloride monohydrate was used in place of the copper 8-hydroxyquinolate. The shear strength values at 500° F. of joined aluminum were as follows: initial—1740 p. s. i.; after heating at 500° F. for 200 hours—695 p. s. i.

*Example VII*

The experiments described in Example I were repeated except that the metal chelates used were the nickel bis-diethylenetriamine dichloride monohydrate and copper bis-diethylenetriamine dibromide monohydrate. The following table gives the parts of chelates contained in the compositions along with the shear strengths at 500° F. before and after heating for 200 hours at 500° F.

| Parts of Metal Chelate | Shear Strength at 500° F., p. s. i. | |
|---|---|---|
| | Initial | After Heating at 500° F. for 200 Hours |
| 0.25 Ni compound | 1,460 | 405 |
| 0.5 Ni compound | 1,185 | 405 |
| 1.0 Ni compound | 1,275 | 570 |
| 2.0 Ni compound | 1,225 | 940 |
| 0.25 Cu compound | 1,400 | 905 |
| 0.5 Cu compound | 1,315 | 905 |
| 1.0 Cu compound | 1,355 | 1,010 |
| 2.0 Cu compound | 1,115 | 620 |

*Example VIII*

Copper glycinate was used as the metal chelate in the formulation and procedure described in Example I. The parts of copper glycinate used in the several compositions are listed in the table below. Besides giving the shear strengths at 500° F. before and after heating for 200 hours, the table also gives the sheer strengths measured at 77° F. before and after the heat treatment.

| Parts of Metal Chelate | Shear Strength at 500° F., p. s. i. | | | |
|---|---|---|---|---|
| | Initial | | Aged 200 Hrs. at 500° F. | |
| | At 77° F. | At 500° F. | At 77° F. | At 500° F. |
| 0.1 | 2,100 | 1,405 | 470 | 540 |
| 0.25 | 2,455 | 1,570 | 805 | 700 |
| 0.5 | 2,380 | 1,495 | 645 | 645 |
| 1.0 | 2,110 | 1,600 | 570 | 485 |
| 2.0 | 2,340 | 1,485 | 370 | 445 |

*Example IX*

In like fashion to that described in Example I, compositions were prepared containing 40 parts of the same glycidyl polyether, 60 parts of the same phenolic resin, 100 parts of aluminum dust, 6 parts of dicyandiamide and the number of parts and kind of metal chelate given in the table below. The compositions were used to adhesively unite sheets of aluminum, cure being effected by baking for one-half hour at 330° F. Original shear strengths at 500° F. were determined as well as such shear strength after heating for 200 hours at 500° F. The results follow:

| Parts of Metal Chelate | Shear Strength at 500° F., p. s. i. | |
|---|---|---|
| | Initial | After Heating at 500° F. for 200 Hours |
| 0.25 Copper glycinate | 1,425 | 780 |
| 1.0 Copper bis-diethylenetriamine dichloride monohydrate | 1,120 | 785 |
| 1.0 Copper bis-diethylenetriamine dibromide monohydrate | 1,285 | 815 |
| 1.0 Copper 8-hydroxyquinoline | 1,365 | 850 |
| None | 1,390 | 105 |

*Example X*

Compositions were prepared and used as described in Example I except that the dicyandiamide was omitted and 0.5 part of the metal chelate listed below was employed. The results follow:

| Metal Chelate | Shear Strength at 500° F., p. s. i. | |
|---|---|---|
| | Initial | After Heating at 500° F. for 200 Hours |
| Copper 8-hydroxyquinoline | 1,200 | 835 |
| Copper salicylaldoxime | 1,295 | 810 |

The glycidyl polyethers of polyhydric phenols referred to herein are condensates of polyhydric phenols with epichlorhydrin. Particularly when derived from dihydric phenols, these materials are known as "ethoxyline" resins. See Chemical Week, vol. 69, page 27, for September 8, 1951.

I claim as my invention:

1. A composition comprising a metal chelate in admixture with a phenol-aldehyde condensate containing reactive hydroxyl groups and a glycidyl polyether of a polyhydric phenol having an epoxy equivalency greater than 1.0, the metal in said chelate having an ionic valence of 2 to 6, inclusive, and a coordination number of 4 to 6, inclusive.

2. A composition comprising a mixture of an A-stage phenolic resin from a phenol and formaldehyde, and a glycidyl polyether of 2,2-bis(4-hydroxyphenyl)propane having an epoxy equivalency between about 1.4 and 2.0, said mixture having incorporated therewith about an added 0.1 to 20% of a metal chelate wherein the metal is an element in the first transition series of the periodic table.

3. The composition as defined in claim 2 wherein the metal of the chelate is copper and the ligand is an aliphatic polyamine.

4. The composition as defined in claim 2 wherein the metal chelate is copper bis-diethylenetriamine dichloride.

5. The composition as defined in claim 2 wherein the metal chelate is chromic 8-hydroxyquinoline.

6. A composition comprising a mixture of a major proportion of an A-stage phenolic resin from condensation of phenol with formaldehyde, and a minor proportion of a glycidyl ether of 2,2bis(4-hydroxyphenyl)propane having an epoxide equivalent weight of from about 250 to 1000, said mixture containing about an added 0.1 to 5% by weight of a copper chelate.

7. The composition as defined in claim 6 wherein the chelate is copper 8-hydroxyquinoline chelate.

8. The composition as defined in claim 6 wherein the chelate is copper salicylaldoxime.

9. The composition as defined in claim 6 wherein the chelate is copper glycinate.

10. As an article of manufacture, a tape comprising a textile impregnated with a mixture of an A-stage condensate of a phenol with formaldehyde and a glycidyl polyether of a polyhydric phenol having an epoxide equivalency greater than 1.0, said mixture also containing a metal chelate, the metal in said chelate having an ionic valence of 2 to 6, inclusive, and a coordination number of 4 to 6, inclusive.

11. As an article of manufacture, a tape comprising a glass fiber textile impregnated with a solid mixed composition containing in parts by weight: about 50 to 75 parts of an A-stage condensate of phenol with formaldehyde, about 25 to 50 parts of a glycidyl polyether of 2,2-bis(4-hydroxyphenyl)propane having an epoxide equivalent weight of about 300 to 700, about 50 to 150 parts of aluminum dust, about 2 to 10 parts of dicyandiamide, and about 0.1 to 5 parts of a copper chelate.

12. The article of manufacture as defined in claim 11 wherein the copper chelate is copper 8-hydroxyquinoline.

13. The article of manufacture as defined in claim 11 wherein the copper chelate is copper bis-diethylenetriamine dichloride.

References Cited in the file of this patent

UNITED STATES PATENTS

| | | |
|---|---|---|
| 2,516,030 | Swiss | July 18, 1950 |
| 2,521,911 | Greenlee | Sept. 12, 1950 |
| 2,582,795 | Prentiss et al. | Jan. 15, 1952 |
| 2,615,860 | Burgess | Oct. 28, 1952 |
| 2,650,184 | Biefeld | Aug. 25, 1953 |
| 2,659,708 | Berger et al. | Nov. 17, 1953 |
| 2,659,711 | Wilkins et al. | Nov. 17, 1953 |
| 2,819,233 | Smith et al. | Jan. 7, 1958 |

FOREIGN PATENTS

| | | |
|---|---|---|
| 677,733 | Great Britain | Aug. 20, 1952 |
| 875,980 | Germany | May 7, 1953 |
| 174,135 | Austria | Feb. 25, 1953 |

OTHER REFERENCES

Black et al.: "Metal-Bonding Adhesives With Improved Heat Resistance," Modern Plastics, December 1954, pages 142 and 237.

Martell-Calvin: "Chemistry of the Metal Chelate Compounds," pages 6, 194, 514, 520, published by Prentice Hall, New York, 1952.

Chatfield: "Varnish Constituents," pages 244–245, published by Leonard Hill Ltd., London, 1953.